(12) United States Patent
Bruun et al.

(10) Patent No.: US 6,471,039 B1
(45) Date of Patent: Oct. 29, 2002

(54) CONVEYOR SYSTEM AND A METHOD FOR OPERATING SAME

(75) Inventors: Brian Bruun, Aachus C (DK); Steen Kibsgaard, Hadsten (DK)

(73) Assignee: Crisplant a/s, Arhus N (DK)

( * ) Notice: Subject to any disclaimer, the term of this patent is extended or adjusted under 35 U.S.C. 154(b) by 0 days.

(21) Appl. No.: 09/209,748

(22) Filed: Dec. 11, 1998

(30) Foreign Application Priority Data

Dec. 12, 1997 (DK) .......................................... 1997 01448
Jun. 15, 1998 (DK) .......................................... 1998 00781

(51) Int. Cl.⁷ .......................................................... B65G 37/00
(52) U.S. Cl. .................................................... 198/577
(58) Field of Search ................................ 198/575, 576, 198/577

(56) References Cited

U.S. PATENT DOCUMENTS

| | | |
|---|---|---|
| 3,776,395 A | 12/1973 | Lingg et al. |
| 3,923,151 A | 12/1975 | Weber |
| 3,982,625 A | 9/1976 | Wentz et al. |
| 4,093,066 A | 6/1978 | Mitchell et al. |
| 4,227,607 A | 10/1980 | Malavenda |
| 4,372,439 A | 2/1983 | Dempsey |
| 4,451,027 A * | 5/1984 | Alper .......................... 198/577 |
| 4,558,776 A | 12/1985 | Lattion |
| 4,640,408 A * | 2/1987 | Eaves .......................... 198/577 |
| 4,653,630 A | 3/1987 | Bravin |
| 4,717,013 A * | 1/1988 | Reissmann et al. ......... 198/577 |
| 4,747,817 A | 5/1988 | Newsome |
| 5,056,647 A | 10/1991 | Rosenbaum |
| 5,058,727 A | 10/1991 | Jahns et al. |
| 5,070,995 A | 12/1991 | Schaffer et al. |
| 5,086,910 A | 2/1992 | Terpstra |
| 5,092,451 A | 3/1992 | Jones et al. |
| 5,150,781 A | 9/1992 | Deisenroth et al. |
| 5,186,308 A | 2/1993 | Munro |
| 5,228,558 A * | 7/1993 | Hall ............................ 198/577 |
| 5,285,887 A | 2/1994 | Hall |
| 5,301,790 A | 4/1994 | Prydtz et al. |
| 5,318,167 A | 6/1994 | Bronson et al. |
| 5,341,915 A | 8/1994 | Cordia et al. |
| 5,358,464 A * | 10/1994 | Funk et al. .................. 198/577 |
| 5,411,131 A | 5/1995 | Haegele |
| 5,474,415 A | 12/1995 | Becker et al. |
| 5,538,127 A | 7/1996 | Becker et al. |
| 5,575,375 A | 11/1996 | Sandusky et al. |
| 5,582,286 A | 12/1996 | Kalm et al. |
| 5,588,790 A | 12/1996 | Lichti |
| 5,638,938 A | 6/1997 | Lazzarotti et al. |

FOREIGN PATENT DOCUMENTS

| | | |
|---|---|---|
| DE | 4115327 A1 | 11/1992 |
| EP | 0577021 A1 | 1/1994 |
| EP | 0581398 A1 | 2/1994 |
| EP | 0456297 B1 | 4/1994 |
| EP | 0630836 A1 | 12/1994 |
| EP | 0659624 A1 | 6/1995 |
| EP | 0778229 A2 | 6/1997 |
| GB | 2251228 A | 7/1992 |

* cited by examiner

*Primary Examiner*—Douglas Hess

(57) ABSTRACT

The present invention relates to a conveyor system, for use, e.g., at airports for conveying luggage, which has a plurality of conveyor sections with variable conveying speed arranged in series and a method for operating same. The conveyed articles may be accelerated on the system and adjacent sections have substantially the same speed and optionally the same acceleration when the articles are passed between them. A downstream speed and optionally also a downstream acceleration is determined for each article being passed to an upstream end of a section. In particular, the invention relates to a conveyor system in which the conveyor sections each has a control unit for controlling the operation of the particular section and which control unit is able to communicate with the control units of the immediately adjacent sections, and the invention relates as well to a method for operating such a system and to the individual section.

53 Claims, 5 Drawing Sheets

CONVEYOR SYSTEM AND A METHOD FOR OPERATING SAME

TECHNICAL FIELD

The present invention relates to a conveyor system having a plurality of conveyor sections arranged in series for transporting articles and a method for operating same. The articles may be accelerated on the conveyor system but adjacent conveyor sections have substantially the same speed when the articles are passed between them so as to reduce wear or damage to the articles. In particular, the invention relates to a conveyor system for use, e.g., at airports for conveying luggage.

BACKGROUND ART

A high speed conveyor system for transportation of luggage between a main airport terminal and a number of aircraft concourse areas is described in U.S. Pat. No. 5,056,647. The luggage is accelerated stepwise from a handling speed of, e.g., 0.5 m/s to a conveying speed of, e.g., 7.6 m/s via a number of acceleration sections, e.g., six, situated in series, where a following section runs with a higher, constant speed than the preceding section. The luggage is transported over a long distance at the high conveying speed and is decelerated stepwise to a handling speed, the deceleration being performed in a similar manner as acceleration, i.e. via a number of deceleration sections. A surveillance system is placed in each section so as to monitor whether a section is being overloaded with luggage, in which case the section is stopped for manual correction.

Another system for transporting luggage in, e.g., airports is described in U.S. Pat. No. 4,227,607. This system comprises a number of consecutive belt conveyor sections capable of running independently and placed between check-in stations and a luggage sorting station. Each section has a photo sensor arranged at the upstream end of the section for detecting pieces of luggage. The conveyor section receives information for the following section regarding whether it is running and receives information from the preceding section regarding whether it has luggage placed on its downstream end. Under normal conditions of use, all sections are running without interruptions. When an end station is blocked by luggage, all sections are stopped, and will under these conditions only be restarted in order to fill up upstream sections with luggage, so as to accumulate luggage.

U.S. Pat. No. 5,150,781 discloses a conveyor module with individual PLC unit and sensors for detecting conveyed objects. The modules may be assembled in a number of ways so as to build up a conveyor system, wherein each control unit of each module is capable of communicating with control units of adjacent modules. The modules are in particular suited for building up a conveyor system for assembly lines. An object of the invention according to U.S. Pat. No. 5,150,780 is to provide a conveyor system, wherein the position of the modules can be switched without requiring a reprogramming of the control units and installation of new cabling between a central control unit and each conveyor module.

U.S. Pat. No. 5,285,887 discloses a conveyor system comprising a number of individual zones, wherein articles can be transported by means of chains, belts, cylinders etc. Each zone is controlled individually and may communicate with the preceding zone and the following zone. The system further comprises sensors for detecting articles on the conveyor system. The system is capable of running both in a forward direction and in a backward direction. Under normal conditions of use, the driving unit of a zone is inactive until an article is present in the preceding zone which passes a control signal to the present zone for activating the driving unit of the present zone. The present zone receives the article and passes it further on to the following zone if a control signal is received from the following zone regarding that it is ready for receiving an article. In case the following zone is not ready for receiving an object, the driving means of the present zone is stopped until the following zone is ready to receive the article. In this way, the conveyor system obtains an ability of accumulating articles.

DESCRIPTION OF THE INVENTION

It has, however, been found that the prior art systems have certain disadvantages, in particular in relation to applications wherein articles are to be accelerated and/or decelerated, and/or in relation to applications wherein articles are to be conveyed over relatively long distances at relatively high conveying speeds, e.g., between airport terminals.

Thus, accelerating and decelerating section of prior art systems may cause wear and/or damage to conveyed articles when passing articles between conveyor sections having different conveying speeds due to slip between the article and the conveyor section. Moreover, at least some of the prior art systems may cause considerable obstructions to the flow of articles in case one or more conveyor sections stop(s) running due to unforeseen events. In particular for applications wherein a number of articles is conveyed over a relatively long distance and wherein a large number of articles is being conveyed along the conveyor system at a time, a temporary stop of a conveyor section may cause a large number of articles to arrive at their destination with a delay. This may cause further delays, e.g., flight departure delays in case the conveyor system is applied for conveying luggage at an airport.

Furthermore, some prior art systems, in particular those comprising relatively long conveyor sections have a tendency of generating a considerable noise level which may be unpleasant to people and in some cases even be hazardous to human ears. The noise may be generated, inter alia, by unsteady oscillations of relatively long and heavy conveyor belts and/or by associated driving units, such as electromotors. As a further disadvantage, such systems have a relatively high energy consumption.

Therefore, an object of the present invention is to provide a conveyor system which is capable of conveying articles both over relatively long distances and over relatively short distances at different conveying speeds while causing a minimum of wear to the conveyed articles when passing from one conveyor section to another. A further object of the present invention is to provide a conveyor system which is flexible in the sense that a unforeseen stop of a single or a few conveyor sections will not instantaneously cause other conveyor sections to stop. A still further object of the invention is to provide a conveyor system which has a relatively low energy-consumption while generating a relatively low noise level.

It is a further object of the invention to provide a conveyor system comprising conveyor sections on which the articles may be conveyed at a low handling speed at a loading station, a discharging station, in curves etc., while being conveyed at a high speed at other locations along the conveyor, and wherein this can be obtained without subjecting the articles to stress when passing from one conveyor section to the other.

A still further object of the invention is to provide a method of operating such a conveyor system.

Thus, the present invention provides a method of operating a conveyor system comprising at least two conveyor sections arranged in series, said method comprising successively loading articles onto the conveyor system, selectively driving the respective conveyor sections at varying speed so as to move the articles thereon in a direction of transportation along the conveyor system, detecting the position of an article on the conveyor system by means of detecting means arranged at one or more locations along the length of said system, generating a detecting signal when an article has been detected by the detecting means, determining, from a speed associated with said article, a desired downstream speed of said article at the downstream end of a first of said conveyor sections, controlling the varying speed of said first conveyor section when said article is conveyed thereby, in response to the detection signal, so as to obtain the previously determined downstream speed of said article when approaching a downstream end of said first conveyor section, and controlling the varying speed of a second of said conveyor sections, the second conveyor section being adjacent to and subsequent to the first conveyor section, so as to obtain substantially the same speed as the article when the article is passing from the first to the second conveyor section.

Preferably, the downstream speed of said article differs from the speed with which the article is passed to the first conveyor section so as to accelerate the article.

Each of the at least one conveyor section may comprise one or more belt conveyors for conveying articles and/or one or more chain conveyors, electromagnetic conveyors, and/or other suitable conveyor means. Belt or chain conveyors may preferably by driven by one or more driving units, such as, e.g., electromotors or other suitable driving devices.

Where in the present context the speed of a conveyor section is mentioned, this should be understood as the speed at which the conveyor means convey articles along the conveyor section in question. Thus, for a conveyor section comprising a belt conveyor, the speed of the conveyor section is the peripheral surface velocity of a conveyor belt.

The conveyor system comprises at least two, and preferably a plurality of conveyor sections arranged adjacent to each other in series. Thus, a conveyor system having a modular design may be built up of a number of conveyor sections.

The conveyor system may be installed, e.g., at airports, railway stations, ship departure halls, factories, production plants, mines or at other locations wherein the modular design of the conveyor system may be applied for obtaining a high conveying capacity. The conveyor system for conveying articles from, e.g., one airport, railway or ship terminal to another. In particular, the conveyor system is suited for conveying articles over relatively long distances, e.g., from one airport terminal to another. Thus, the conveyor system may convey articles over a distance of, e.g, 1 km. However, the distance may also be longer, such as 2–5 km or even more than 5 km. The conveyor system may also extend over shorter distances, such as 500–1000 m, 200–500 m, 50–200 m, 10–50 m or less than 10 m.

Normally, each article comprises a supporting member, such as, e.g., a tray or a container carrying or containing one or more items, such as, e.g., one or more pieces of luggage, factory products or other items. However, an article may comprise an item only which is not supported by a supporting member. In case supporting members for supporting items are provided, a conveyor system may comprise two conveyor lines, each of which comprises at least one or more conveyor section arranged in tandem. Thus, a first conveyor line may convey articles, i.e. supporting members loaded with items, from a loading position to an unloading position, whereas a second conveyor line may convey emptied or unloaded supporting members to a loading position. Typically, the second conveyor line may convey trays in a direction opposite to the conveying direction of the first conveyor line. One or more transmitting stations comprising means for transmitting supporting members from the first to the second conveyor line are preferably provided. Such means may comprise displacement means such as, e.g., hydraulic, pneumatic or electrical activators, a rotating disc arranged in the plane of the immediately preceding conveyor section.

Preferably, the method is adapted so that each conveyor section may convey only one article or supporting member at a time. However, the method and the conveyor system may be adapted so that more than one article or supporting member may be conveyed at a time along a conveyor section.

The detecting means may comprise one or more photo cells, cameras, photo diodes, acoustic detecting means and/or other optical or acoustical detecting means, including infrared light and ultra sonic detecting devices comprised in at least one of the at least one conveyor section. The detecting means may further comprise one or more load sensing devices detecting the load carried by a conveyor section.

The speed associated with an article is preferably the speed that it has been determined that the article will have when passing between the two conveyor sections, but it may also be a speed at a position further upstream from which the passing speed may be determined. The speed may alternatively be measured directly by means of a sensor aimed at the article at the conveyor means of the preceding conveyor section.

The conveyor system normally comprises an accelerating part comprising one or more conveyor sections for increasing the speed of conveyed articles, a main conveying part comprising at least one and usually a plurality of conveyor sections along which articles under normal conditions of use are being conveyed at a substantially constant speed, and a decelerating part comprising one or more conveyor sections for decreasing the speed of conveyed articles. The speed of two consecutive conveyor sections, i.e. the speed at which the conveying means convey articles, are substantially the same during the time interval in which an article is passing from a given conveyor to the immediately following conveyor section, i.e. during the time interval during which an article is being carried by two consecutive conveyor sections at a time. By substantial is understood within 25%, preferably within 15% and most preferred within 10% variation. In a more preferred alternative the speed of the individual conveyor section is also being controlled so as to obtain substantially the acceleration of adjacent conveyor sections when an article is passing from one of said adjacent sections to the other. This may be achieved by control means optionally co-operating with sensing or detecting means comprised in one or more of the conveyor sections, as described in detail below. By adjusting the speed of consecutive conveyor sections as described above, wear on the articles due to slip between the articles and the conveyor means may be eliminated or at least reduced. In particular, increasing or decreasing the speed of an article is obtained very efficiently when consecutive conveyor sections are controlled so that their acceleration is substantially the same when an article is passed from one to the other.

By the term acceleration is understood increasing or decreasing the speed ("decelleration") with a constant rate of change of the speed.

Thus, the method may further comprise the steps of
determining, from a speed associated with said article, a desired downstream acceleration of said article at the downstream end of a first of said conveyor sections,
controlling the varying speed of the first conveyor section when said article is conveyed thereby so as to obtain the previously determined acceleration of said article when approaching a downstream end of said first conveyor section, and
controlling the varying speed of the second conveyor section so as to obtain substantially the same acceleration as the article when the article is passing from the first to the second conveyor section.

When an article has been completely passed from a first conveyor section to a second conveyor section, the second conveyor section may increase or decrease the conveying speed while the article is being conveyed along the second conveyor section, thereby accelerating or decelerating the article without causing slip between the article and the conveyor means. Obviously, the conveying speed of the second conveyor section may be kept at a substantially constant level while conveying the article along the section. Simultaneously, the conveying speed of the first conveyor section may be controlled as described in detail below. In particular, a conveyor section may be stopped if the following conveyor section is not ready to receive an article.

The conveyor sections may be driven at different speeds with either a relatively low handling speed at, e.g., loading and/or unloading stations, at turning stations, in curves and during changes in vertical level, and with a relatively high transport speed along other pathways, such as, e.g., straight portions of the conveyor system. This enables a high mean transport speed and thus a high transport capacity of the conveyor system. The relatively low handling speed is usually faster than 0 m/s, usually between 0.1 and 3 m/s, preferably between 0.5 and 2.5 m/s, such as between 0.7 and 2.2 m/s, usually between 1 and 2 m/s, such as between 1.5 and 1.8 m/s. The relatively high transport speed is usually between 2 and 20 m/s, such as between 3 and 15 m/s, usually between 5 and 12 m/s, such and between 6 and 10 m/s. However, handling and transport speeds beyond the above-mentioned ranges may be applied.

In the present context the term "stop" in connection with conveyor sections should be understood as being brought to a complete stop, i.e. being brought to a velocity of zero, or as being slowed down to a speed which is substantially slower than the speed of the conveyor section prior to the "stop", i.e. being brought to a relatively slower velocity less than zero.

Preferably a conveyor section is stopped when no article is present thereon and when no article is approaching from the preceding conveyor section. Thereby the energy consumption of the conveyor system and the noise generated by the system may be minimized or at least reduced.

The presence of an article on a conveyor section may be determined from the detecting signal or signals and from the varying speed of said conveyor section. The detecting signal (s) may be provided from detecting means as described above and the speed of one or more conveyor sections may be obtained by means of speed detection means thereof and generating a speed detecting signal proportional to the varying speed of the conveyor section.

According to an advantageous method of the present invention, at least a given conveyor section as well as the immediately preceding and the immediately following conveyor sections each comprises a control unit for controlling the varying speed of the conveyor section and data communication means, the data communication means of the preceding conveyor section being adapted to communicate data from the control unit of the preceding conveyor section to the control unit of the given conveyor section, and the data communication means of the given conveyor section being adapted to communicate data from the control unit of the given conveyor section to the control unit of the following conveyor section, and wherein the operation of the given conveyor comprises the steps of
receiving data from the control unit of the preceding conveyor section regarding the speed with which an approaching article will pass from the preceding conveyor section to the given conveyor section,
controlling the varying speed of the given conveyor section so as to obtain substantially the same speed as the article when the article is passing from the preceding conveyor section to the given conveyor section,
passing the article from the preceding conveyor section to the given conveyor section,
determining a desired downstream speed of the article at the downstream end of the given conveyor section, based on the data previously received from the control unit of the preceding conveyor section regarding the speed with which an approaching article will pass from the preceding conveyor section to the given conveyor section,
communicating the determined speed to the control unit of the following conveyor section, and
varying the speed of the given conveyor section so as to reach the determined speed when the article is approaching the downstream end of the given conveyor section.

The method of operating a given conveyor according to the present invention may further comprise the steps of
receiving data from the control unit of the preceding conveyor section regarding the acceleration with which an approaching article will pass from the preceding conveyor section to the given conveyor section,
controlling the varying speed of the given conveyor section so as to obtain substantially the same acceleration as the acceleration of the article when the article is passing from the preceding conveyor section to the given conveyor section,
determining a desired downstream acceleration of the article at the downstream end of the given conveyor section, based on the data previously received from the control unit of the preceding conveyor section regarding the speed with which the approaching article will pass from the preceding conveyor section to the given conveyor section,
communicating the determined acceleration to the control unit of the following conveyor section, and
varying the speed of the given conveyor section so as to reach the determined acceleration when the article is approaching the downstream end of the given conveyor section.

For special applications of the conveyor system, the method and the conveyor system may be adapted for bi-directional conveying of articles. Thus, the conveying direction of one or more conveyor sections may be reversed.

The control of the individual conveyor sections or at least of some of the individual conveyor sections may be performed either by a distributed control system or by a central control system. In a distributed control system, an individual conveyor section comprises a data processor unit. The control unit of the given conveyor section preferably communicates with the control units of the immediately preceding and of the immediately following conveyor sections only. However, in a distributed control system, the control unit of the given conveyor section may alternatively/additionally communicate with control units of other conveyor sections. In a central control system, the data communication means of an individual conveyor section may communicate with a central control unit comprising data processing means and optionally communicate with one or more control units of one or more further conveyor section. The central control unit may further comprise data storage means, such as computer readable memory, and data input/output means such as a keyboard and/or a monitor.

Preferably, every single conveyor section comprised in the conveyor system may be provided with data communication means. In a conveyor system having a distributed control system, every single conveyor section preferably comprises a control unit comprising a data processing unit. In a conveyor system having a central control system, one or more central processor units are provided at least one of which preferably communicates with the control unit of every single conveyor section.

The conveyor sections are individual units, each preferably comprising all necessary mechanical parts and control units for running the conveyor section. When the control system is a distributed control system, the conveyor sections are connected each to the two adjacent conveyor sections by data connection means for enabling communication to and from the control unit of each of the adjacent conveyor sections and with means for power supply. Thus, a system comprising these conveyor sections is easy and flexible to install or reinstall, as there is no need for cables connecting a central control unit to each conveyor section. The only input a section needs upon installation may be the preselection of a nominal speed of articles transported on the individual conveyor section when they approach the downstream end of the conveyor section.

According a method of the present invention, at least a given conveyor section may further comprise data communication means being adapted to communicating data from the control unit of the given conveyor section to the control unit of the preceding conveyor section, and at least the conveyor section immediately following the given conveyor section comprises data communication means being adapted to communicating data from the control unit of the immediately following conveyor section to the control unit of the given conveyor section, and wherein the operation of the given individual conveyor further comprises the steps of receiving data from the control unit of the following conveyor section indicating whether the following conveyor section is ready to receive an article, stopping the conveyor section in case the following section is not ready to receive an article, starting the conveyor section, when data have been received from the control unit of the following conveyor section regarding that the following section is ready to receive an article, in case the given conveyor section has been stopped because the following section was not ready to receive an article, communicating, when the article has left the given conveyor section, data to the control unit of the preceding conveyor section indicating that the given conveyor section is ready to receive an article.

Thus, operation of the conveyor system is flexible and allows for a maximum degree of utilisation of the conveyor sections. In operating situations where a downstream conveyor section has been stopped or decelerated, upstream conveyor sections may continue conveying articles at a relatively high conveying speed. When an article reaches a conveyor section immediately preceding to a conveyor section which has been stopped, the preceding conveyor section will stop or decelerate so as to avoid articles of colliding. Thereby a domino effect allowing for accumulation of articles is provided by the method according to the invention. Such a situation may, e.g., occur if unloading of articles from the conveyor system at a downstream location is being performed at a rate which is slower than the rate at which articles are being fed onto the conveyor system at an upstream location. Such a situation may further occur, e.g., if an article is blocking a conveyor section, e.g., due to clamping of the article between side walls or other parts of the conveyor system, or it may occur, e.g., due to manual shut down of a conveyor section, e.g., during servicing of the conveyor section.

Where in the present context the term "nominal speed" of a conveyor section or of an article is used, this should be understood as a determined or selected speed at which a given conveyor section is to convey an article when passing the article to a downstream conveyor section or to any other downstream device, such as, e.g., a curve, a turning unit or a discharge station, or when receiving an article from an upstream conveyor section or from any other upstream device, such as, e.g., a curve, a turning unit or a loading station.

According to an embodiment of the invention, a given conveyor section is stopped by its control unit when an article is no longer present thereon and when no article is approaching from the preceding conveyor section.

Preferably, at least a given conveyor section comprises detecting means for detecting the presence of an article on the conveyor section, said detecting means being arranged near the upstream end of the conveyor section, the detecting means generating a detecting signal when an article has been detected by the detecting means and transmitting said signal to the control unit of the conveyor section, and wherein the operation of the given conveyor further comprises the steps of detecting that an article has been passed on to the given conveyor section, and determining when the article has left the given conveyor section, based on said detecting signal and the varying speed of the conveyor section.

It would be a further advantage if the operation of the given conveyor, in case the given conveyor section is stopped with an article present thereon, comprises the steps of determining the position of the article present on the conveyor section based on said detecting signal and the varying speed of the conveyor section, and determining a desired downstream speed of said article at the downstream end of the given conveyor section, based on the position of the article thereon. Thus, the control unit of the conveyor section will from the determined position of the article be able to start the operation of the conveyor section efficiently after it has been stopped including accelerating the article that was present on the conveyor section when it was stopped. These steps replace an alternative and less efficient operation after a stop in the conveyor section runs with a slow speed until the article is passed on the following conveyor section where its presence is detected by the detecting means of that conveyor section.

In case the conveyor is of the type where not only the speed but also the acceleration is substantially equal for two adjacent conveyor sections when an article is passing from one to the other, the operation after a stop might further comprise the step of determining a desired downstream acceleration of the article at the downstream end of the given conveyor section, based on the position of the article thereon.

In the above described operational steps after a stop of the conveyor section, both the determined speed and the rate of change of the speed will be communicated to the following conveyor section similar to the procedure in the continuous operation of the conveyor sections.

It is an advantage if at least the given conveyor section comprises speed detection means generating a speed detecting signal proportional to the magnitude of the varying speed of the conveyor section and transmitting said signal to the control unit of the conveyor section, so that the control unit may determine the varying speed from said signal. The speed detection means may, e.g., comprise an optical encoder that detects the angular speed of one of the wheels or rollers that supports or drives the articles or supports or drives a conveyor belt that engages with the articles, or the speed detection means may, e.g., comprise a number of equidistant marks on a conveyor belt and an optical encoder counting the frequency of the marks passing the encoder.

An optional and advantageous feature that may be included in the method of operating the conveyor according to the invention involves a conveyor section, wherein the data communication means of the preceding conveyor section communicates data relating to the identity of an article passing from the preceding conveyor section to the given conveyor section, from the control unit of the preceding conveyor section to the control unit of the given conveyor section so that the data relating to the identity of the article follows the article being transported on the conveyor.

Thereby administration of articles is carried out in an efficient way which requires a minimum of data storage capacity in the control system controlling the conveyor system. By letting data relating to the identity of an article physically follow the article to which the data relate, only identity data need to be stored. No supervision data related to the actual position, speed, destination etc. of the article need to be stored. Data regarding the identification of the items transported on the conveyor are at the loading station preferably transferred to the control unit of the conveyor section onto which the items are loaded, and these data are then again transferred from one conveyor section to another together with the item to which they belong. These data may concern the destination of the item, the mass of the item etc. The data concerning the destination may be used at the unloading station to determine whether a specific item should be unloaded at that station.

Another important piece of information that may be transmitted by the data communication means is the weight of the article. According to this embodiment of the invention, the data communication means of the preceding conveyor section communicates data relating to the weight of an article passing from the preceding conveyor section to the given conveyor section, from the control unit of the preceding conveyor section to the control unit of the given conveyor section so that the data relating to the weight of the article follows the article when it is being transported on the conveyor. The information about the weight of the article may be used by the control unit of the given conveyor unit as a further parameter to determine the desired downstream speed of the article. The weight information may also be used as a further parameter for determining the desired downstream acceleration of the article in embodiments of the invention where the articles may be transferred from one conveyor section to an adjacent conveyor section at a common rate of change of the speed. Furthermore, the weight information may be used at a discharge station as a parameter to determine at which acceleration in a direction transversal to the conveying direction of the conveyor a tray may be discharged without causing items carried on the trays to fall off, thus enabling a more efficient discharge procedure.

The invention further relates to a conveyor or conveyor system for transporting articles and to conveyor sections having individual control units, the conveyor system and conveyor sections comprising the features and having the characteristics described above.

The conveyor may preferably comprise a driving unit, such as, e.g. an electromotor, associated to each individual conveyor section, the driving unit being dimensioned for driving the given conveyor section with one article of a predetermined maximum mass thereon at a predetermined maximum conveying speed. Thereby the maximum power to be generated by the driving unit is well-defined and known. Thus, the risk of damaging driving units due to overload may be eliminated or at least reduced.

Preferably the supporting members or trays have an upper surface of a concave shape as viewed in a cross-section perpendicular to the longitudinal direction of the conveyor so as to avoid items carried by the supporting members to fall off during transportation. Furthermore, the upper surface of the trays or supporting members is preferably coated with a friction increasing material so as to prevent items carried by the trays from falling off during transportation. Furthermore, a suitable shape as well as surface coating of the trays increase the acceleration that may be applied to the trays in a direction transversal to the conveying direction in order to discharge the trays from the conveyor without causing the items carried on the trays to fall off during the discharging operation, thus enabling a more efficient discharge of tray from the conveyor.

The high speed conveyor system preferably comprises two parallel conveyors or conveyor lines driven in opposite directions, where each conveyor comprises a number of conveyor sections. The two conveyors are connected in both ends with a recycling unit for shifting trays from the downstream end of one conveyor to the upstream end of the other conveyor, thereby forming an endless conveying path for the trays together with the two conveyors.

The trays are preferably loaded with items such as luggage at one or more loading stations along the high speed conveyor, and the items are preferably discharged at one or more discharging stations.

The system may utilize trays of different sizes where large size trays usually are used for, e.g., luggage of large dimensions, such as skies, baby carriages etc.

The invention further concerns a method of discharging a tray from a conveyor, said method comprising the steps of
engaging the tray with a discharging member, moving the member when engaging the tray with a speed in a direction transverse to the transport direction of the conveyor, so as to move the tray in a direction substantially transverse to the transport direction of the conveyor in order to discharge the tray from the conveyor, and changing the speed of the member in a direction transverse to the transport direction of the conveyor with a substantially constant positive rate of change, the rate of change being determined so that an item placed on a tray to be discharged will follow the tray during the discharging operation, so as to obtain a fast discharge of the tray from the conveyor.

The discharging member may comprise wheels for engaging the trays so as to reduce wear on the trays.

The apparatus for discharging trays from the conveyor preferably comprises a control unit for controlling the discharge of trays, so that the method further comprises the steps of transmitting data identifying the item placed on the tray approaching the apparatus, from a control unit of a conveyor section immediately upstream of the apparatus to the control unit of the apparatus, determining, based on the data, whether the tray is to be discharged, and if the tray is to be discharged, activating the apparatus in order to discharge the tray from the conveyor.

The item will often have to be discharged from the tray after the tray has been discharged from the conveyor. The present invention further concerns a method of discharging at least one item from a tray and an apparatus for carrying out the method. The method comprises the steps of allowing the tray to slide down an inclined surface, stopping the tray by letting it collide with an edge projecting substantially vertical from said surface, and discharging said at least one item from the tray by letting it continue its movement beyond said edge due to its inertia and the force of gravity.

An apparatus according to the invention for carrying out the above method of discharging items from a tray comprises a first receiving means for receiving trays that have been discharged from said conveyor, said first receiving means being arranged adjacent to the longitudinal side of said conveyor opposite to said member, and said first receiving means having a first upper surface where at least part of that surface is inclined in a direction away from the conveyor with an angle sufficient to discharge items from one of said trays if the tray is placed on said surface, a second receiving means for receiving items discharged from trays, said second receiving means being arranged adjacent to said first receiving means, said second receiving means having a second upper surface for receiving said items, and an edge formed between the first upper surface and the second upper surface where said edge is projecting sufficiently upwards from the first upper surface to stop the movement in the direction of the inclination of the first surface of trays present on the first surface so as to discharge the items present on said trays onto said second surface and keep the tray on the first surface.

The invention also concerns an apparatus for carrying out the method of discharging trays from a conveyor. The apparatus comprises at least one conveyor section on which the trays are being conveyed, said apparatus comprising a member for discharging trays from a conveyor by engaging a tray on the conveyor and displacing said tray in a direction substantially transversal to the transport direction of the conveyor, said member being arranged adjacent to a longitudinal side of the conveying means, a device on which said member is mounted, said device allowing the member to perform a discharging movement, where during the time period of said movement where the member engages the article to be discharged, the speed of said member in a direction transverse to the transport direction of the conveyor is being changed with a substantially constant positive rate of change, the rate of change being determined so that an item placed on a tray to be discharged will follow the tray during the discharging operation so as to obtain a fast discharge of the tray from the conveyor, and drive means for driving said member in said movement for discharging a tray from the conveyor.

The device on which the member is mounted may advantageously be pivotally connected eccentrically to two pivots defining two axes that are substantially parallel. The device may in a preferred embodiment further comprise two first parts being rigidly connected to the member with substantially the same distance in between as the distance between the two pivots, and two second parts, each of which is being pivotally connected to an associated one of said first parts and each of which second parts also being connected to an associated one of said pivots.

A conveyor system where items are carried on trays that are discharged from the conveyor according to the above descriptions may according to the invention further comprise recycling means for returning the empty trays to at least one loading station, said recycling means comprising a first conveyor for transporting empty trays from said first surface to a turning unit, a second conveyor for transporting empty trays from the turning unit to said at least one loading station, and a turning unit for receiving trays from the first conveyor and feeding said trays onto the second conveyor.

DETAILED DESCRIPTION OF FIGURES

Figure 1:
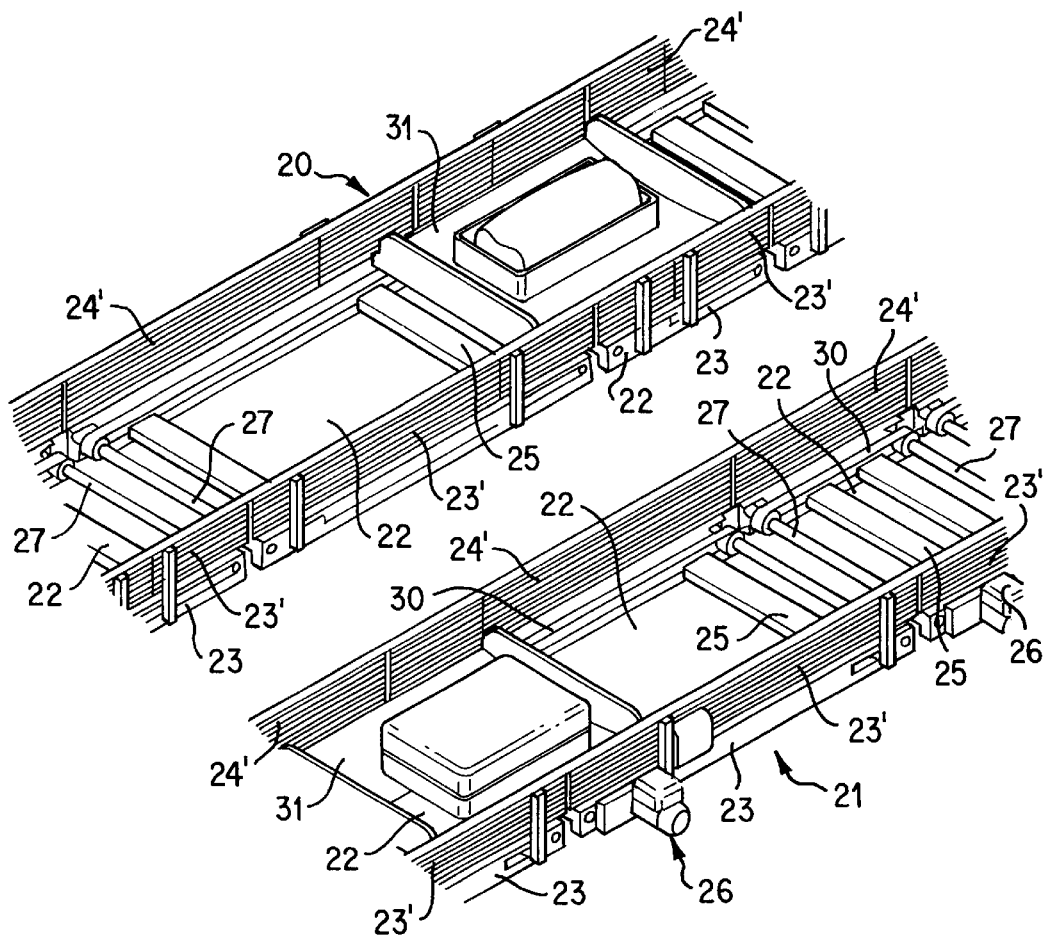
FIG. 1 shows two conveyors each comprising a number of conveyor sections.

FIG. 1 shows two conveyors 20, 21 each comprising a number of conveyor sections 22. Each conveyor section has a frame comprising two longitudinal side walls 23, 24 and a number of cross-bars 25 connecting the two side walls. One of the cross-bars carries an asynchronous electric motor 26 for driving a roller 27 via a tooth belt transmission. The motor 26 has a built-in microprocessor and a frequency converter for regulating the motor 26.

Figure 2:
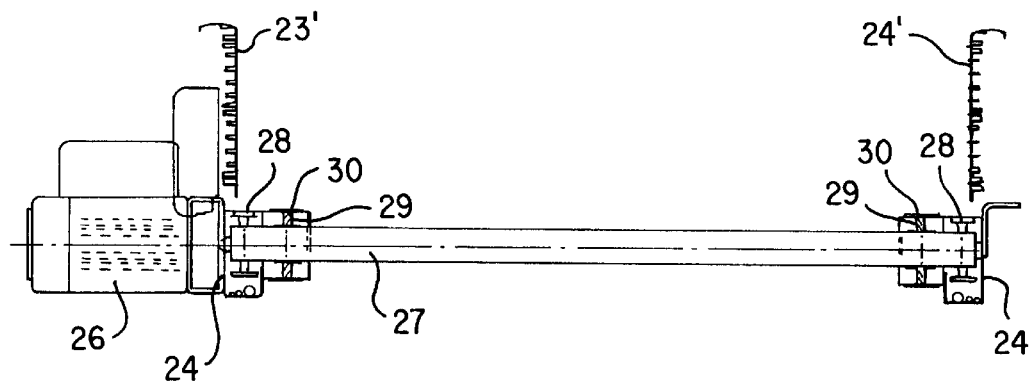
FIG. 2 shows a cross-section of a conveyor section.

The rollers 27, as shown on FIG. 2, are made from galvanized steel tubes. The rollers 27 are mounted at their end portions with ball-bearings on profiles 28 mounted on the side walls 23, 24. The rollers 27 each has a disc 29 mounted near each of their ends for driving, supporting and centring an endless belt 30 at each side. The belts 30 are adapted to convey articles, such as trays 31 which are transported by the conveyor system.

The belts 30 are further supported by support rollers and support devices such as, e.g., tracks, profiles, etc., with low-frictional surfaces for minimising friction and thereby wear on the belt and energy consumption. Aluminium profiles 23', 24'mounted along each side wall 23, 24 direct and center the trays on the conveyor section.

A photo sensor is mounted near the upstream end of each conveyor section for detecting articles on the conveyor section.

Each conveyor section has its individual control unit for controlling the conveyor section and for communicating with the control units of adjacent conveyor sections or other adjacent units, such as loading stations, discharging stations etc. The control units are standard electronic units, made, e.g., as hardware units or as programable units comprising a data processing unit and computer readable memory, such as, e.g., EPROM.

In a preferred embodiment of the invention, the operation of a given conveyor section involves the following steps:

a) in case no article is present on the conveyor section, transmitting data to the control unit of an immediately preceding conveyor section regarding that the given conveyor section is ready to receive an article, b) receiving data from the control unit of the preceding conveyor section regarding which speed the preceding conveyor section will have when an approaching article will pass from the preceding conveyor section to the given conveyor section, c) receiving data from the control unit of the preceding conveyor section regarding the identity of an approaching article, d) controlling the speed of the given conveyor section so as to obtain substantially the same speed as the preceding conveyor when an article is passing from the preceding conveyor section to the given conveyor section, e) passing the article from the preceding conveyor section to the given conveyor section, f) detecting that an article has been passed on to the given conveyor section, g) receiving data from the control unit of an immediately following conveyor section regarding that the following conveyor section is ready to receive an article, h) stopping the conveyor section in case the following section is not ready to receive an article, i) starting the conveyor section if the conveyor section has been stopped due to data received from the control unit of the following conveyor section, in case data have been received from the control unit of the following conveyor section regarding that the following section is ready to receive an article, j) selecting at which speed the article should be conveyed when approaching the downstream end of the conveyor section, based on a preselected speed for the given individual conveyor section and the present speed of the conveyor section, k) communicating the speed selected in step l) to the control unit of the following conveyor section, l) transmitting data to the control unit of the following conveyor section regarding the identity of the article that is approaching the downstream end of the given conveyor section, m) varying the speed of the conveyor section so as to reach the speed selected in step j) when the article is approaching the downstream end of the conveyor section, n) determining the time interval during which the article is being conveyed by the given conveyor section, based on the signal detected in step f) and on the varying conveying speed, o) when the article has left the given conveyor section, transmitting data to the control unit of the preceding conveyor section regarding that the given conveyor section is ready to receive an article, p) when an article is no longer present thereon and when no article is approaching from the preceding conveyor section, stopping the drive means of the conveyor section.

The trays 31, 49 on which the items to be transported are placed have a concave upper surface 32 as when seen in a cross-section perpendicular to the transport direction. Each tray 31, 49 has vertical screens 33 provided at the front and rear ends as seen in the transport direction. The concave surface, the screens and the coated with a friction increasing material such as natural or synthetic rubber reduce the risk for items to accidentally leave the tray 31, 49, and at the same time the concave surface enables discharging of items from the tray 31, 49 by tilting the tray 31, 49. The trays 31, 49 are made of a material which is preferably both vibration dampening, chock absorbing and knockproof The normal trays 31 are of a size that is suitable for containing one item of the type that is mostly transported by the conveyor system. For luggage, a suitable length is between 0.75 m and 1.75 m, preferably approximately 1.25 m and a suitable width is between 0.5 m and 1.5 m, preferably approximately 1 m.

Figure 3:
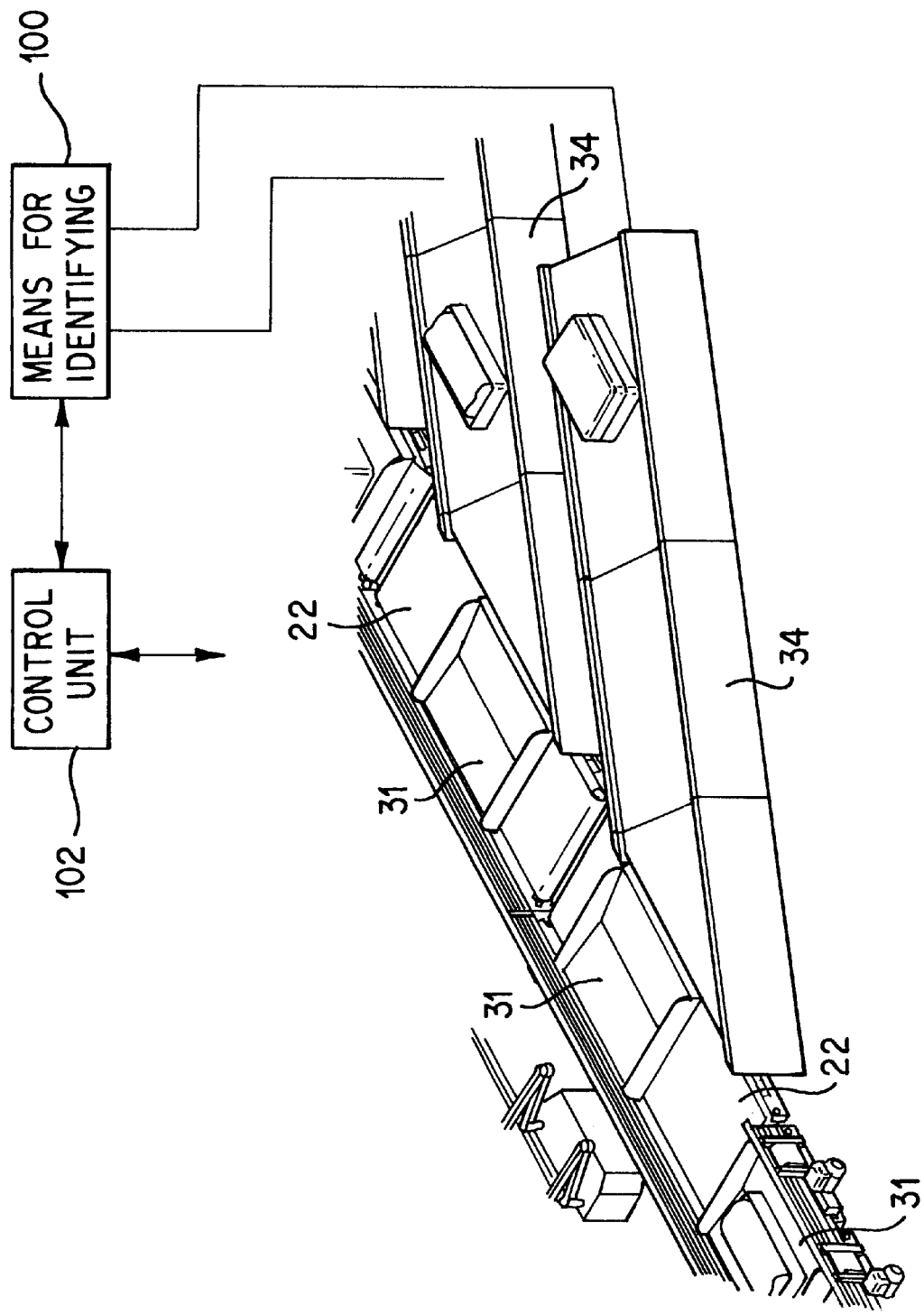
FIG. 3 shows a loading station for loading items onto trays on the conveyor system.

As shown on FIG. 3, the trays 31 are loaded with items at one or more loading stations arranged along the conveyor system. Each loading station may comprise one or more loading conveyors 34 which are arranged with an acute angle to the conveyor sections so that the items have a speed in the transport direction of the conveyor sections when being loaded onto the trays 31, which speed is preferable substantially the same as the speed of the trays 31 at the loading station. Furthermore, each loading station transmits data regarding the identity of each item to the control unit 102 of the conveyor section receiving the item. The conveyor sections at the loading station drive the trays at a handling speed between 1 m/s and 2.5 m/s, preferably approximately 1.7 m/s. Upstream from loading conveyors 34 are means 100 for identifying an article.

An item is discharged from the conveyor system by discharging the tray carrying the item from the conveyor and then discharging the item from the tray. A discharge station 35 is shown on FIG. 4, the station 35 comprising a discharge surface 36 preferably equipped with roller-ball racks or having another friction reducing design, arranged between two conveyor sections, a discharge member 37 for discharging trays 31 from the discharge surface 36, and an activating device 38 on which the member 37 is mounted, the activating device 38 allowing the member 37 to perform a discharging movement. The station 35 further comprises a first receiving surface 39 which is inclined away from the discharge surface 36, the receiving surface 39 being adapted for receiving the discharged trays 31 from the discharge surface 36 and moving the emptied trays to a conveyor 46. A projecting edge 40 is provided for stopping the movement of the tray 31 along the first receiving surface 39 away from the discharge surface 36. A second receiving surface 41 for receiving the item that is discharged from the tray 31 is further comprised in the discharge station 35. The discharge station 35 further comprises drive means for driving the member 37 in its discharging movement and a control unit for controlling the discharge of trays 31 from the conveyor.

The device 38 on which the discharge member 37 is mounted comprises two pivots 42, defining two parallel, vertical axes, two first bars 43 rigidly connected to the member 37, the spacing between the connections of two first bars 43 to the member 37 being substantially the same as the spacing between the two pivots 42. The device 38 further comprises two second bars 44, each of which is pivotally connected to an associated one of the first bars 43, each second bar 44 further being connected to an associated one of said pivots 42.

Figure 4:
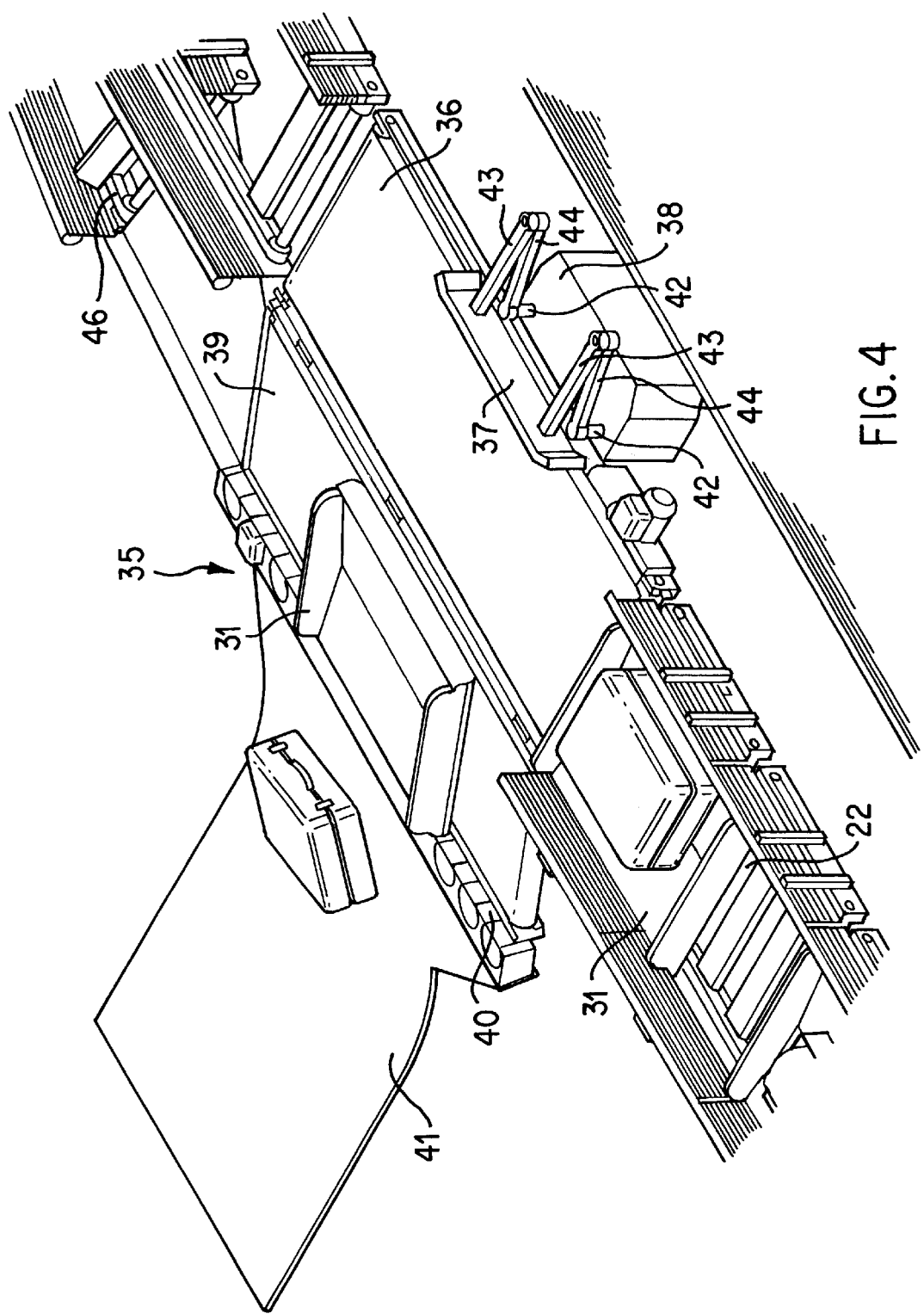
FIG. 4 shows a discharge station for discharging trays from the conveyor system and for discharging items from the trays.

The device 38 allows the member 37 to perform a discharging movement, during which the member 37 pushes a tray 31 from the discharge surface 36 in a direction transverse to the transport direction of the conveyor in order to discharge the tray 31 from the discharge surface 36 onto the first receiving surface 39. While the member 37 is in contact with the tray 31, the member 37 is accelerated in the direction transversal to the longitudinal direction of the conveyor with a substantial constant acceleration of a magnitude so that an item carried on the surface of the tray follows the tray during the discharging operation without falling off the tray. Thereby, the tray is discharged fast and the discharge member 37 is at the same time having a speed in the longitudinal direction of the conveyor during the discharge operation, whereby the member 37 is prevented from affecting an immediately following tray conveyed by the conveyor onto the discharge surface 36. During one discharge movement of the member, the member 37 and the device 38 describe one full turn around the pivots 42 so that the member 37 returns to its starting position adjacent to the discharge surface 36 as illustrated in FIG. 4.

In a preferred embodiment of the invention, the conveyor section upstream of the discharge station 35 drives the trays 31 with a handling speed which is normally between 1 m/s and 2.5 m/s, preferably approximately 1.7 m/s when passing trays 31 to the discharge surface 36. The data identifying the item on an approaching tray 31 are transmitted from the control unit of the conveyor section immediately upstream of the discharge station 35 to the control unit of the discharge station 35. Based on these data, the control unit of the discharge station 35 determines whether the tray is to be discharged. In case the tray 31 is to be discharged, the drive means for driving the member 37 are activated so as to discharge the tray 31. The tray 31 is then sliding down the first receiving surface 39 which is inclined, until it hits the projecting edge 40. However, due to gravity and its inertia, the item on the tray 31 will continue its movement in a direction transverse to the transport direction of the conveyor, the item thereby being discharged from the tray 31 onto the second receiving surface 41.

Figure 5:
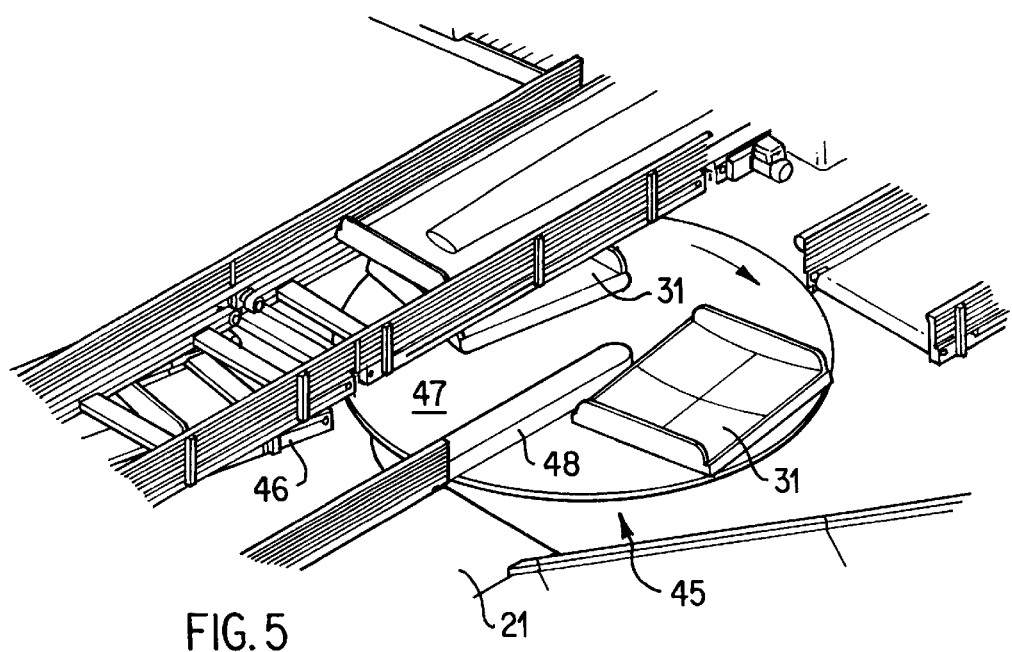
FIG. 5 shows a recycling unit for feeding the empties trays onto a conveyor for conveying the trays to one or more loading stations.

In a preferred embodiment, the empty trays 31 are transported from the first receiving surface to a recycling unit 45 by a conveyor 46. The recycling unit 45 which is shown in FIG. 5 comprises a substantially horizontal disc 47 rotating about a substantially vertical axis. The trays 31 are loaded onto the disc 47 by the conveyor 46. The trays 31 are turned and given a speed in the transport direction of the conveyor 21 for conveying the trays to one or more loading stations. The trays 31 are fed onto the conveyor 21 by the rotational movement of the disc 47 and by an arm 48.

Figure 6:
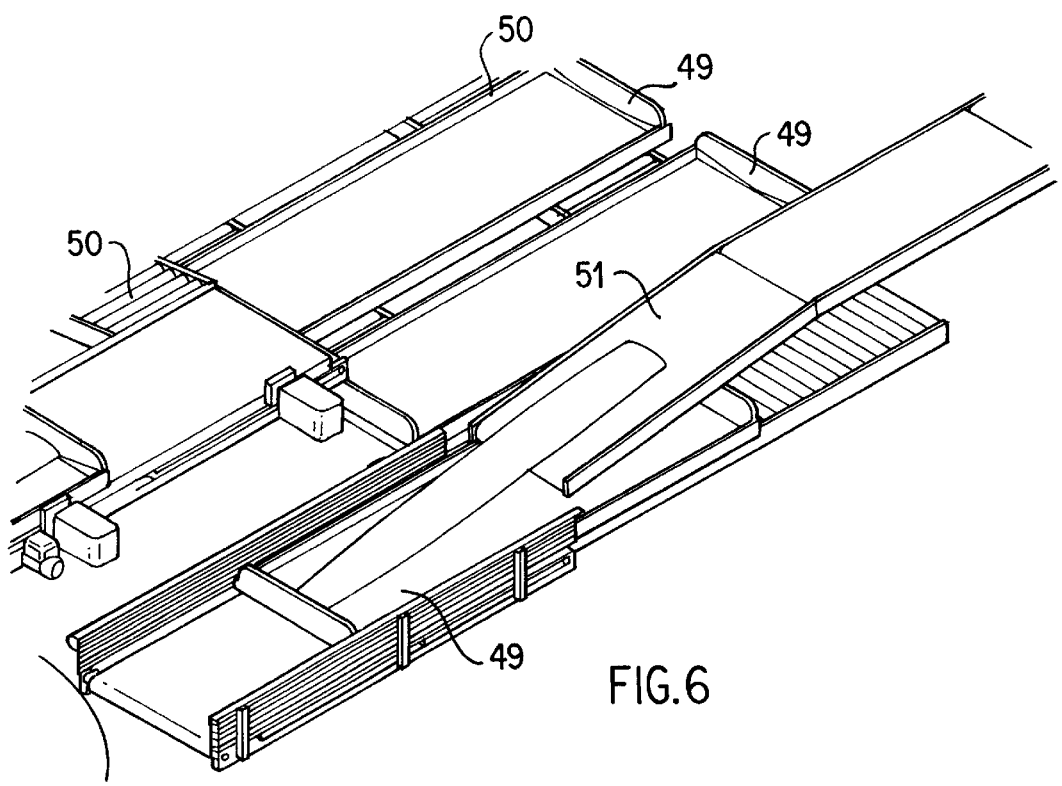
FIG. 6 shows a loading station for loading special trays onto the conveyor system and for loading items onto the special trays.

Special trays 49, as shown on FIG. 6, are used for conveying items of relatively large dimensions, such as skies, baby carriages etc. The special trays 49 which have a width substantially equal to the width of the normal trays 31 have a length normally between 2 m and 8 m, preferably about 5 m.

The special trays 49 are automatically loaded onto the conveyor system by a roller rack 50 arranged adjacent to the conveyor. The loading of items onto the special tray 49 is performed manually at one or more special loading stations by placing each item on a chute 51 from where it slides down to the special tray 49. The loading of the special trays 49 onto the conveyor and the loading of items onto the special trays 49 is performed when the trays are conveyed at a handling speed normally between 1 m/s and 2.5 m/s, preferably approximately 1.7 m/s.

Figure 7:
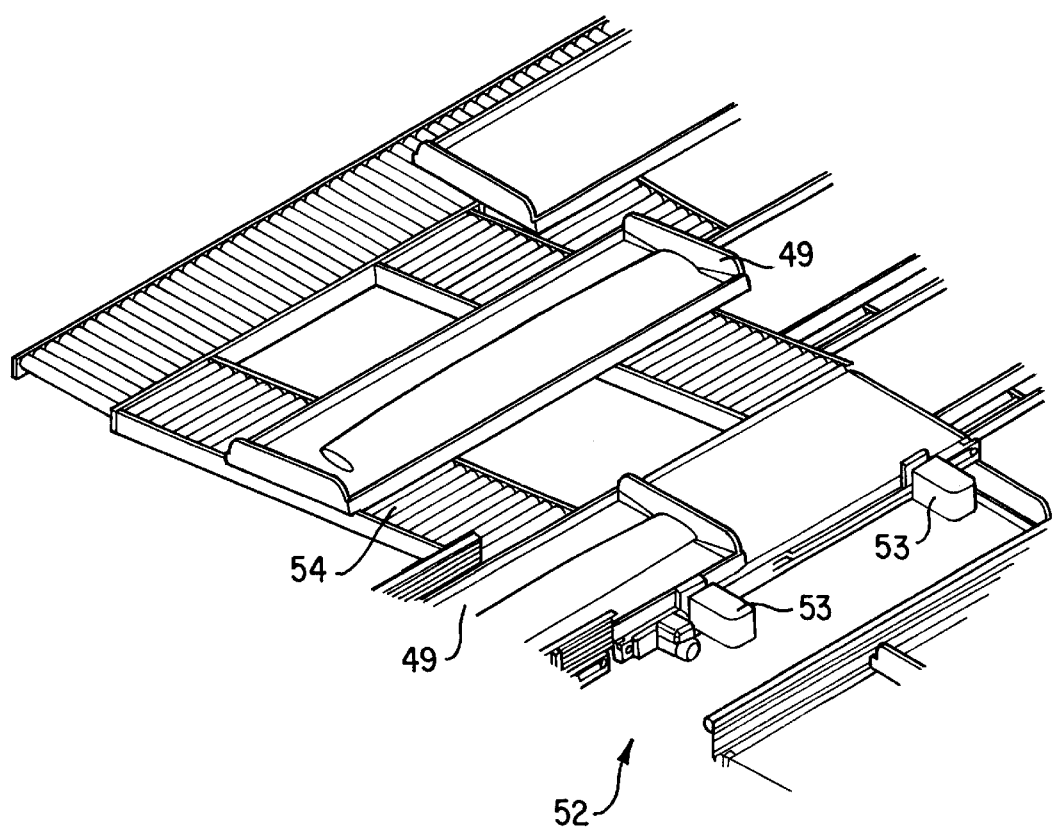
FIG. 7 shows a discharge station for discharging special trays from the conveyor system and for discharging items from the trays.

The special trays 49 are discharged from the conveyor system at one or more special discharge stations 52 as shown on FIG. 7. The discharge station 52 comprises activating devices 53 for displacing the special trays 49 transversally to the transport direction. The special trays 49 are discharged onto a roller rack 54 arranged adjacent to the conveyor, and the items present on the special trays 49 are then discharged manually. The discharge of the special trays 49 from the conveyor is normally performed when the trays are conveyed at a handling speed normally between 1 m/s and 2.5 m/s, preferably approximately 1.7 m/s.

What is claimed is:

1. A method of operating a conveyor system comprising a plurality of conveyor sections arranged in series, said method comprising:

successively loading articles on the conveyor system by at least one loading station arranged along the conveyor sections, selectively driving the respective conveyor sections at varying speed so as to move the articles thereon in a direction of transportation along the conveyor system, detecting the position of an article on the conveyor system by means of detecting means arranged at one or more locations along the length of said system, generating a detecting signal when an article has been detected by the detecting means, determining for each of the plurality of conveyor sections a desired downstream speed of an article at the downstream end of said conveyor section from the speed the article will have when passing to said conveyor section, controlling the varying speed of said conveyor section when said article is conveyed thereby, in response to the detection signal, so as to obtain the previously determined downstream speed of said article when approaching a downstream end of said conveyor section, controlling the varying speed of the conveyor section being adjacent to and subsequent to said conveyor section, so as to obtain substantially the same speed as the article when the article is passing from said conveyor section to said subsequent conveyor section, and successively unloading articles from the conveyor system to a plurality of discharge stations arranged along the conveyor sections.

2. A method according to claim 1, wherein the downstream speed of said article differs from the speed with which the article is passed to said conveyor section so as to accelerate the article.

3. A method according to claim 1, and comprising the steps of:
   determining, from a speed associated with said article, a desired downstream acceleration of said article at the downstream end of said conveyor section,
   controlling the varying speed of said conveyor section when said article is conveyed thereby so as to obtain the previously determined acceleration of said article when approaching a downstream end of said conveyor section, and
   controlling the varying speed of said subsequent conveyor section so as to obtain substantially the same acceleration as the article when the article is passing from said conveyor section to said subsequent conveyor section.

4. A method according to claim 1, wherein a conveyor section is stopped if the subsequent conveyor section is not ready to receive an article.

5. A method according to claim 1, wherein a conveyor section is stopped when no article is present thereon and when no article is approaching from the preceding conveyor section.

6. A method according to claim 5, wherein the presence of an article on a conveyor section is determined from the detecting signal and from the varying speed of said conveyor section.

7. A method according to claim 6, wherein at least one of the conveyor sections comprises speed detection means generating a speed detecting signal proportional to the magnitude of the varying speed of the conveyor section.

8. A method according to claim 1, wherein at least a given conveyor section as well as the immediately preceding and the immediately following conveyor sections each comprises a control unit for controlling the varying speed of the conveyor section and data communication means, the data communication means of the preceding conveyor section being adapted to communicate data from the control unit of the preceding conveyor section to the control unit of the given conveyor section, and the data communication means of the given conveyor section being adapted to communicate data from the control unit of the given conveyor section to the control unit of the following conveyor section, and wherein the operation of the given conveyor comprises the steps of
   receiving data from the control unit of the preceding conveyor section regarding the speed with which an approaching article will pass from the preceding conveyor section to the given conveyor section,
   controlling the varying speed of the given conveyor section so as to obtain substantially the same speed as the article when the article is passing from the preceding conveyor section to the given conveyor section,
   passing the article from the preceding conveyor section to the given conveyor section,
   determining a desired downstream speed of the article at the downstream end of the given conveyor section, based on the data previously received from the control unit of the preceding conveyor section regarding the speed with which an approaching article will pass from the preceding conveyor section to the given conveyor section,
   communicating the determined speed to the control unit of the following conveyor section, and
   varying the speed of the given conveyor section so as to reach the determined speed when the article is approaching the downstream end of the given conveyor section.

9. A method according to claim 8, wherein the operation of the given conveyor further comprises the steps of
   receiving data from the control unit of the preceding conveyor section regarding the acceleration with which an approaching article will pass from the preceding conveyor section to the given conveyor section,
   controlling the varying speed of the given conveyor section so as to obtain substantially the same acceleration as the acceleration of the article when the article is passing from the preceding conveyor section to the given conveyor section,
   determining a desired downstream acceleration of the article at the downstream end of the given conveyor section, based on the data previously received from the control unit of the preceding conveyor section regarding the speed with which the approaching article will pass from the preceding conveyor section to the given conveyor section,
   communicating the determined acceleration to the control unit of the following conveyor section, and
   varying the speed of the given conveyor section so as to reach the determined acceleration when the article is approaching the downstream end of the given conveyor section.

10. A method according to claim 8, wherein at least a given conveyor section comprises data communication means being adapted to communicating data from the control unit of the given conveyor section to the control unit of the preceding conveyor section, and at least the conveyor section immediately following the given conveyor section comprises data communication means being adapted to communicating data from the control unit of the immediately following conveyor section to the control unit of the given conveyor section, and wherein the operation of the given individual conveyor further comprises the steps of
   receiving data from the control unit of the following conveyor section indicating whether the following conveyor section is ready to receive an article,
   stopping the conveyor section in case the following section is not ready to receive an article,
   starting the conveyor section, when data have been received from the control unit of the following conveyor section regarding that the following section is ready to receive an article, in case the given conveyor section has been stopped because the following section was not ready to receive an article,
   communicating, when the article has left the given conveyor section, data to the control unit of the preceding conveyor section indicating that the given conveyor section is ready to receive an article.

11. A method according to claim 8, wherein the given conveyor section is stopped by its control unit when no article is present thereon and when no article is approaching from the preceding conveyor section.

12. A method according to claim 8, wherein at least a given conveyor section comprises detecting means for detecting the presence of an article on the conveyor section, said detecting means being arranged near the upstream end of the conveyor section, the detecting means generating a detecting signal when an article has been detected by the detecting means and transmitting said signal to the control unit of the conveyor section, and wherein the operation of the given conveyor further comprises the steps of detecting that an article has been passed on to the given conveyor section, and determining when the article has left the given conveyor section, based on said detecting signal and the varying speed of the conveyor section.

13. A method according to claim 12, wherein the operation of the given conveyor section in case the given conveyor section is stopped with an article present thereon further comprises the steps of determining the position of the article present on the conveyor section based on said detecting signal and the varying speed of the conveyor section, and determining a desired downstream speed of said article at the downstream end of the given conveyor section, based on the position of the article thereon.

14. A method according to claim 13 and comprising the step of determining a desired downstream acceleration of the article at the downstream end of the given conveyor section, based on the position of the article thereon.

15. A method according to claim 8, wherein at least the given conveyor section comprises speed detection means generating a speed detecting signal proportional to the magnitude of the varying speed of the conveyor section and transmitting said signal to the control unit of the given conveyor section.

16. A method according to claim 8, wherein the data communication means of the preceding conveyor section communicates data relating to the identity of an article passing from the preceding conveyor section to the given conveyor section, from the control unit of the preceding conveyor section to the control unit of the given conveyor section so that the data relating to the identity of the article follows the article being transported on the conveyor.

17. A method according to claim 8, wherein the data communication means of the preceding conveyor section communicates data relating to the weight of an article passing from the preceding conveyor section to the given conveyor section, from the control unit of the preceding conveyor section to the control unit of the given conveyor section so that the data relating to the weight of the article follows the article when it is being transported on the conveyor.

18. A method according to claim 17, wherein the weight of the article is used as a further parameter for determining the desired downstream speed of the article.

19. A method according to claim 17, wherein the weight of the article is used as a further parameter for determining the desired downstream acceleration of the article.

20. A conveyor for transporting articles and comprising:

a plurality of conveyor sections, driving means for selectively driving each individual conveyor section at a variable speed, at least one loading station arranged along the conveyor sections for loading articles onto the conveyor sections, a plurality of discharge stations arranged along the conveyor sections for receiving articles being unloaded from the conveyor sections, detecting means for detecting the presence of an article at one or more predetermined positions along the length of the conveyor and for generating a detection signal when an article has been detected, and control means for controlling the driving means of each of said conveyor sections in response to a detection signal received from the detecting means and a speed associated with the detected article, so as to determine and obtain a desired downstream speed of said article at the downstream end of each conveyor section, the control means further controlling the driving means of said conveyor sections such that a conveyor section being adjacent to and subsequent to a previous conveyor section obtain substantially the same speed as the article when the article is passing from the previous to the present conveyor section.

21. A conveyor according to claim 20, wherein the control means can control the driving means so that the downstream speed of said article differs from the speed with which the article is passed to the conveyor section so as to accelerate the article.

22. A conveyor according to claim 20, wherein the control means can control the driving means of each of the individual conveyor sections so as to stop the driving means of a conveyor section if the following conveyor section is not ready to receive an article.

23. A conveyor according to claim 20, wherein the control means can control the driving means of each of the individual conveyor sections so as to stop the driving means of a conveyor section when no article is present thereon and when no article is approaching from the preceding section.

24. A conveyor according to claim 23, wherein the control means can determine the presence of an article on an individual conveyor section from the detection signal and from the varying speed of said conveyor section.

25. A conveyor according to claim 24, wherein at least one of the conveyor sections comprises speed detection means generating a speed detecting signal proportional to the magnitude of the varying speed of the conveyor section.

26. A conveyor according to claim 20, wherein the control means can control the driving means of each of the individual conveyor sections so as to obtain substantially the same acceleration of adjacent conveyor sections when an article is passing from one of said adjacent sections to the other.

27. A conveyor according to claim 22, wherein each individual conveyor section comprises a control unit for controlling the varying speed of the driving means of said given conveyor section, data communication means being adapted to communicate data regarding the speed with which an approaching article will pass from the preceding conveyor section to the given conveyor section, from the control unit of the preceding conveyor section to the control unit of the given conveyor and data communication means being adapted to communicate data regarding the speed with which an article will pass from the given conveyor section to the following conveyor section, from the control unit of the given conveyor section to the control unit of the following conveyor section.

28. A conveyor according to claim 27, wherein each individual conveyor section comprises data communication means adapted to communicate data regarding the acceleration with which an approaching article will pass from the preceding conveyor section to the given conveyor section, from the control unit of the preceding conveyor section to the control unit of the given conveyor and data communication means adapted to communicate data regarding the acceleration with which an article will pass from the given conveyor section to the following conveyor section, from the control unit of the given conveyor section to the control unit of the following conveyor section.

29. A conveyor according to claim 27, wherein each individual conveyor section comprises data communication means being adapted to communicate data indicating that the given conveyor section is ready to receive an article, from the control unit of the given conveyor section to the control unit of the preceding conveyor section, and data communication means being adapted to communicate data indicating that the following conveyor section is ready to receive an article, from the control unit of the following conveyor section to the control unit of the given conveyor section.

30. A conveyor according to claim 27, wherein said control unit for controlling the speed of the driving means of each individual conveyor section can stop the driving means of the given conveyor section when no article is present thereon and when no article is approaching from the preceding conveyor section.

31. A conveyor according to claim 27, wherein each individual conveyor section comprises detecting means for detecting the presence of an article on the given conveyor section, said detecting means being arranged near the upstream end of the given conveyor section, the detecting means generating a detecting signal when an article has been detected by the detecting means and transmitting said signal to the control unit of the given conveyor section, the control unit of the given conveyor section being able to determine when the article has left the given conveyor section, based on said detecting signal and the varying speed of the given conveyor section.

32. A conveyor according to claim 31, wherein the control unit of the given conveyor section, in case the given conveyor section is stopped with an article present thereon, can determine the position of said article, based on said detecting signal and the varying speed of the given conveyor section, and can determine a desired downstream speed of said article at the downstream end of the given conveyor section, based on the position of the article thereon.

33. A conveyor according to claim 32, wherein the control unit of the given conveyor section, in case the given conveyor section is stopped with an article present thereon, can determine a desired downstream acceleration of the article at the downstream end of the given conveyor section, based on the position of the article thereon.

34. A conveyor according to claim 27, wherein each individual conveyor section comprises speed detection means generating a speed detecting signal being proportional to the magnitude of the varying speed of the conveyor section and transmitting said signal to the control unit of the conveyor section.

35. A conveyor according to claim 27, wherein the data communication means of the preceding conveyor section are adapted for transmitting data relating to the identity of an article passing from the preceding conveyor section to the given conveyor section, from the control unit of the preceding conveyor section to the control unit of the given conveyor section.

36. A conveyor according to claim 27, wherein the data communication means of the preceding conveyor section are adapted for transmitting data relating to the weight of an article passing from the preceding conveyor section to the given conveyor section, from the control unit of the preceding conveyor section to the control unit of the given conveyor section.

37. A conveyor according to claim 20, wherein said driving unit of each individual conveyor section is dimensioned for driving the given conveyor section with one article of a predetermined maximum mass thereon at a predetermined maximum conveying speed.

38. A conveyor according to claim 20 comprising trays on which items to be conveyed by the conveyor are placed, so that the articles comprise a tray with one or more items placed thereon.

39. A conveyor according to claim 20, wherein said trays have an upper surface of a concave shape as viewed in a cross-section perpendicular to the transport direction of the conveyor.

40. A conveyor according to claim 20, wherein the upper surface of said trays are coated with a friction increasing material.

41. A conveyor according to claim 20 for transporting trays, wherein the conveyor comprises at least one station for loading trays onto the conveyor, at least one station for loading items onto the trays and at least one station for discharging trays from the conveyor, the at least one station for discharging including:

a member for discharging trays from a conveyor by engaging a tray on the conveyor and displacing said tray in a direction substantially transversal to the transport direction of the conveyor, said member being arranged adjacent to a longitudinal side of the conveying means;

a device on which said member is mounted, said device allowing the member to perform a discharging movement, the speed of said member in a direction transverse to the transport direction of the conveyor is being changed with a substantially constant positive rate of change during the time period of said movement in which the member engages the article to be discharged, the rate of change being determined so that an item placed on a tray to be discharged will follow the tray during the discharging operation so as to obtain a fast discharge of the tray from the conveyor; and drive means for driving said member in said movement for discharging a tray from the conveyor.

42. A conveyor section for being arranged between an identical preceding conveyor section and an identical following conveyor section, the given conveyor section comprising:

a control unit, driving means for driving the given conveyor section at a variable speed, detecting means for detecting the presence of an article at one or more predetermined positions along the length of the given conveyor section, generating a detection signal when an article has been detected and transmitting said signal to the control unit of the given conveyor section, data communication means being adapted to communicate data to the control unit of the given conveyor section, regarding the speed with which an approaching article will pass from the preceding conveyor section to the given conveyor section, data communication means being adapted to communicate data from the control unit of the given conveyor section, regarding the speed with which an article will pass from the given conveyor section to the following conveyor section, wherein the control unit can control the varying speed of the driving means so as to obtain substantially the same speed as the article when the article is passing from the preceding conveyor section to the given conveyor section, the control unit further being able to control the varying speed of the driving means in response to a detection signal received from the detecting means and the speed with which the detected article pass from a preceding conveyor section to the given conveyor section, so as to determine and obtain a desired downstream speed of said article at the downstream end of the given conveyor section.

43. A conveyor section according to claim 42, wherein the control unit can control the driving means so that the downstream speed of said article differs from the speed with which the article is passed to the given conveyor section so as to accelerate the article.

44. A conveyor section according to claim 42 comprising data communication means adapted to communicate data to the control unit of the given conveyor, regarding the acceleration with which an approaching article will pass from a preceding conveyor section to the given conveyor section, and data communication means adapted to communicate data from the control unit of the given conveyor section, regarding the acceleration with which an article will pass from the given conveyor section to a following conveyor section, wherein the control unit can control the driving means so as to obtain substantially the same acceleration as the article when said article is passing from a preceding conveyor section to the given conveyor section.

45. A conveyor section according to claim 42 comprising data communication means being adapted to communicate data from the control unit indicating that the given conveyor section is ready to receive an article, and data communication means being adapted to communicate data to the control unit indicating that a following conveyor section is ready to receive an article.

46. A conveyor section according to claim 45, wherein the control unit can control the driving means so as to stop the driving means if the following conveyor section is not ready to receive an article.

47. A conveyor section according to claim 46, wherein the control unit of the given conveyor section, in case the given conveyor section is stopped with an article present thereon, can determine the position of said article, based on said detecting signal and the varying speed of the given conveyor section, and can determine a desired downstream speed of said article at the downstream end of the given conveyor section, based on the position of the article thereon.

48. A conveyor according to claim 47, wherein the control unit of the given conveyor section, in case the given conveyor section is stopped with an article present thereon, can determine a desired downstream acceleration of the article at the downstream end of the given conveyor section, based on the position of the article thereon.

49. A conveyor section according to claim 42, wherein the control unit can determine the presence of an article on the given conveyor section from the detection signals and from the varying speed of the given conveyor section, and the control unit can stop the driving means when no article is present on the given conveyor section and when no article is approaching from the preceding conveyor section.

50. A conveyor section according to claim 49 comprising speed detection means generating a speed detecting signal proportional to the magnitude of the varying speed of the given conveyor section and communicating said detecting signal to the control unit.

51. A conveyor section according to claim 42, wherein detecting means for detecting the presence of an article on the given conveyor section are arranged near the upstream end of the given conveyor section.

52. A conveyor section according to claim 42 comprising data communication means adapted for communicating identity data to the control unit, which data relate to the identity of an article passing from a preceding conveyor section to the given conveyor section.

53. A conveyor section according to claim 42 comprising data communication means adapted for transmitting weight data to the control unit, which data relate to the weight of an article passing from a preceding conveyor section to the given conveyor section.

* * * * *